(12) United States Patent  
Hogan et al.

(10) Patent No.: US 6,582,002 B2
(45) Date of Patent: Jun. 24, 2003

(54) GOLF CART DASHBOARD HAVING WASTE RECEPTACLE IN COMBINATION WITH DRINK CUP HOLDERS

(76) Inventors: Jeffrey A. Hogan, 6417 Longwood Trace La., Lakeland, FL (US) 33811; Raymond L. Moats, 5107 Lake-in-the-Woods, Lakeland, FL (US) 33813

( * ) Notice: Subject to any disclaimer, the term of this patent is extended or adjusted under 35 U.S.C. 154(b) by 0 days.

(21) Appl. No.: 09/930,702

(22) Filed: Jun. 26, 2001

(65) Prior Publication Data

US 2002/0195831 A1 Dec. 26, 2002

(51) Int. Cl.⁷ .............. B62D 25/14; B60R 7/06; B65F 1/12
(52) U.S. Cl. ............. 296/37.12; 296/70; 280/DIG. 5; 220/908.1; 220/495.06
(58) Field of Search .......................... 296/37.1, 37.8, 296/37.9, 37.12, 70, 77.1, 79, 83; 280/DIG. 5; 224/528, 483, 274, 278, 282; 428/2, 34.1; D12/16; 206/335, 496, 527; 220/908.1, 495.05, 495.06, 495.11, 506, 908; 312/317.1

(56) References Cited

U.S. PATENT DOCUMENTS

| | | | | |
|---|---|---|---|---|
| 3,186,414 A | * | 6/1965 | Davis ......................... 131/236 |
| 3,613,566 A | * | 10/1971 | Shapleigh, Jr. .......... 312/317.1 |
| 3,861,296 A | * | 1/1975 | Clar ............................. 100/343 |
| 4,087,126 A | * | 5/1978 | Wynn ......................... 296/37.8 |
| 4,989,767 A | * | 2/1991 | Buschbom .................. 224/274 |
| 5,181,555 A | * | 1/1993 | Chruniak .................. 248/205.2 |
| 5,199,449 A | * | 4/1993 | Dabringhaus et al. ... 296/37.12 |
| 5,246,190 A | * | 9/1993 | Swirkal ....................... 248/100 |
| 5,361,978 A | * | 11/1994 | Monroe ...................... 220/908 |
| 5,381,921 A | * | 1/1995 | Bray et al. ................... 220/908 |
| 5,489,121 A | * | 2/1996 | Mohr .................... 280/DIG. 5 |
| 5,718,301 A | * | 2/1998 | Williams .................... 180/65.1 |
| 5,890,615 A | * | 4/1999 | Petras ......................... 220/908 |
| 5,890,756 A | * | 4/1999 | Pranger et al. .......... 296/37.12 |
| 6,276,553 B1 | * | 8/2001 | Vulcano ................ 220/495.06 |
| 6,283,321 B1 | * | 9/2001 | Meshorer .............. 220/495.07 |
| 6,334,542 B1 | * | 1/2002 | Hsu ............................. 220/263 |

* cited by examiner

Primary Examiner—D. Glenn Dayoan
Assistant Examiner—G Blankenship
(74) Attorney, Agent, or Firm—George A. Bode; Lisa D. Velez; Bode & Associates

(57) ABSTRACT

A golf cart dashboard for use with a golf cart which integrates into the center of a dashboard faceplate a waste receptacle assembly for storing trash or refuse. The waste receptacle assembly has integrated therewith a beverage holder rack. The waste receptacle assembly include a removable receptacle housing and a rotatable waste receptacle which rotates to and from a closed position and an open position about the receptacle housing. The dashboard may further include driver's side and passenger's side dashboard compartments or glove boxes and designated areas for storing golf balls and tees.

18 Claims, 2 Drawing Sheets

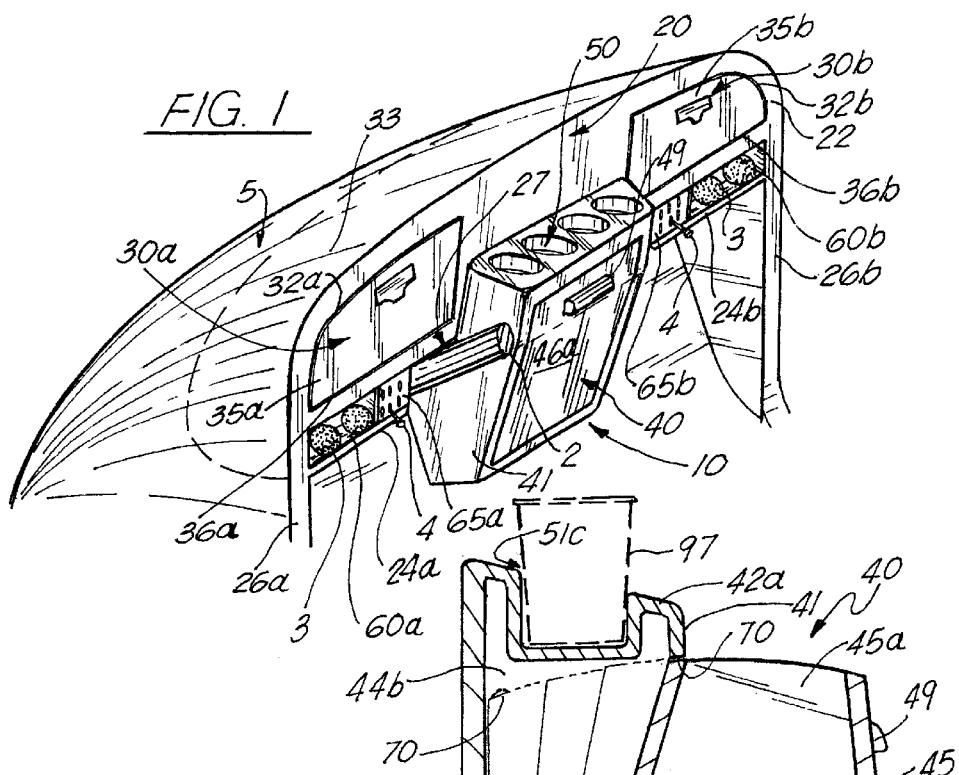
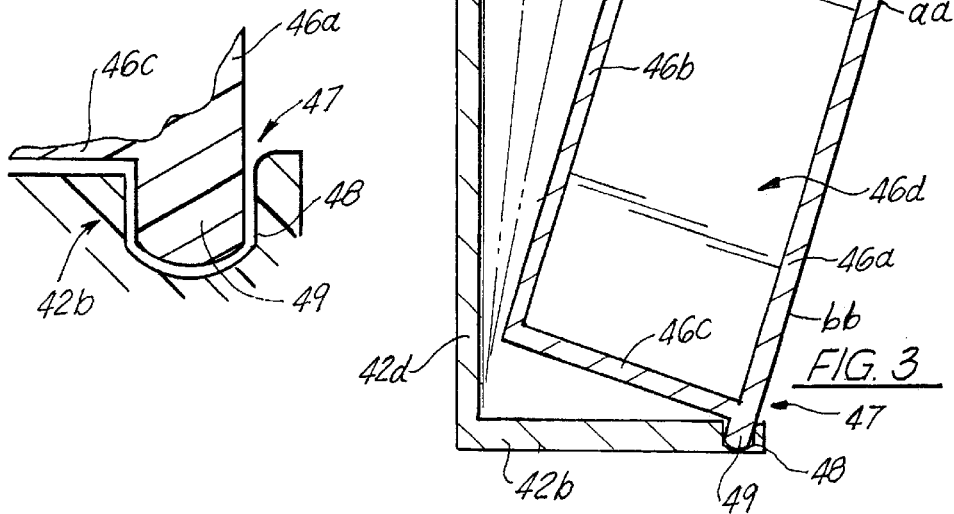

GOLF CART DASHBOARD HAVING WASTE RECEPTACLE IN COMBINATION WITH DRINK CUP HOLDERS

BACKGROUND OF THE INVENTION

1. Field of the Invention

The present invention relates to golf cart dashboards and, more particularly, to a golf cart dashboard having a waste receptacle in combination with a drink holder rack.

2. General Background

It is not uncommon for golfers to play eighteen (18) holes over several hours in the hot sun. To prevent dehydration, the golfers should replenish the fluids lost from sweat, such fluids are often in the form of sodas, bottled water or the like. Most or all golf carts have drink holders for holding an open beverage container when the golfer is golfing. Overtime, several beverages may be consumed. Unless, the beverage container is disposed of, the empty unattended beverage container may be blown away by wind or fall out of a golf cart as the golf cart travels over the hilly terrain of the golf course and, thus, litter the golf course. Golf course litter is further compounded by snack wrappings, plastic bags or other trash.

Although beverage containers and snack wrappers and fruit remains are relatively small and lightweight and can be easily disposed of, oftentimes, the empty beverage containers hold residual liquid and snack wrappers hold residual crumbs or there are fruit remains which can spill on the seats or floors of the golf cart.

U.S. Pat. No. 5,718,301, issued to Williams, entitled "GOLF CART WITH GOLF CLUB CARRYING RACK" discloses a self-propelled golf cart having an interior dashboard or dashpanel comprising a driver's side and passenger's side glove-boxes and driver's side and passenger's side recesses for storage of golf balls and a plurality of holes near for storage of golf tees. The interior dashboard or dashpanel also includes a flange-like portion into which are formed a plurality of recesses for holding drink containers. A separate housing or container is connected under the flange-like portion. As described, the container may be used to carry ice or drinks.

U.S. Pat. No. 5,094,500, issued to Textron Inc., of Providence, R.I., on the application of Maypole et al., entitled "GOLF CART HAVING AN IMPROVED ROOF" which discloses a conventional golf cart having a utility storage area in the form of a basket-like structure positioned behind the golf cart driver and passenger seats.

U.S. Pat. No. 4,989,767, issued to Buschbom, entitled "GOLF CART COOLER" discloses a cooler releasably mounted on the front end or, alternately, inside on the dash of the passenger compartment of a motorized golf cart.

U.S. Pat. Nos. D373,099, D369,762, D345,717 and D345,718, issued to Textron Inc., of Providence, R.I., on the application of Molzon et al., entitled "GOLF CAR"; U.S. Pat. No. D320,580 issued to Hyundai Precision & Ind. Co., Ltd., of South Korea, on the application of D. J. Kim, entitled "GOLF CAR"; U.S. Pat. No. D255,558 issued to Yamaha Hatsudoki Kabushiki Kaisha, of Japan, on the application of K. Ekuan, entitled "GOLF CAR"; U.S. Pat. No. D245,592 issued to AMF Incorporated, of White Plains, N.Y., on the application of W. G. Davidson, entitled "COMBINED GOLF CAR AND REMOVABLE CANOPY THEREFOR"; U.S. Pat. No. D236,098 issued to Westinghouse Electric Corp., of Pittsburgh, Pa., on the application of D. E. Bedel, entitled "GOLF CAR"; and, No. D395,023, issued to Yamaha Hatsudoki Kabushiki Kaisha, of Japan, on the application of A. Hikida, entitled "GOLF CART"; each disclose a golf car or cart that has various front-end and dashboard designs, some of which illustrate holes or recesses.

As can be readily seen there is a continuing need for a golf cart dashboard which includes a waste receptacle with is generally enclosed where trash or empty containers can be discarded so that the trash or the empty beverage containers does not litter the golf course.

As will be seen more fully below, the present invention is substantially different in structure, methodology and approach from that of other golf cart dashboards.

SUMMARY OF THE PRESENT INVENTION

The preferred embodiment of golf cart dashboard of the present invention solves the aforementioned problems in a straight forward and simple manner.

Broadly, the present invention contemplates a golf cart dashboard for use with a golf cart comprising a dashboard faceplate with a driver's side and passenger's side dashboard compartments or glove boxes and a removable waste receptacle assembly having integrated therewith a beverage holder rack and coupled, preferably, in the center of the dashboard faceplate, wherein the center waste receptacle assembly is positioned between the driver's side and passenger's side dashboard compartments or glove boxes.

The present invention further contemplates a golf cart dashboard having a means for supporting golf balls integrated into the dashboard faceplate and a means for supporting golf tees integrated into the dashboard faceplate.

The present invention further contemplates a waste receptacle assembly that can be adapted to fit on a golf cart in an area other than the dashboard, or, that can be mounted in another location (e.g., on a wall).

In view of the above, an object of the present invention is to provide a golf cart dashboard includes a waste receptacle assembly having a generally enclosed waste receptacle which is capable of being rotated to and from a closed and an open position about a receptacle housing wherein in the closed position the waste receptacle orifice is covered to maintain the trash or refuse in the waste receptacle.

Another object of the present invention is to provide a golf cart dashboard having a waste receptacle assembly which is positioned, preferably, in the center of the dashboard faceplate between the driver's side and the passenger's side for easy access by the passenger and the driver to discard trash or refuse.

In view of the above, a feature of the present invention is to provide a golf cart dashboard having a waste receptacle assembly in combination with a drink holder rack which conveniently positions the waste receptacle assembly.

Still another object of the present invention is to provide a waste receptacle assembly having a generally enclosed waste receptacle which is capable of being rotated to and from a closed and an open position about a receptacle housing wherein in the closed position the waste receptacle orifice is covered to maintain the trash or refuse in the waste receptacle.

Another feature of the present invention is to provide a golf cart dashboard having a waste receptacle assembly, and, such a waste receptacle, which are relatively simple structurally and, thus, simple to manufacture.

The above and other objects and features of the present invention will become apparent from the drawings, the description given herein, and the appended claims.

BRIEF DESCRIPTION OF THE DRAWING

For a further understanding of the nature and objects of the present invention, reference should be had to the following description taken in conjunction with the accompanying drawings in which like parts are given like reference numerals and, wherein:

FIG. 1 illustrates a perspective view of the golf cart dashboard of the present invention deployed on a front end of a golf cart;

FIG. 3 illustrates a cross sectional view along the PLANE 3—3 of FIG. 2; and,

FIG. 4 illustrates a cross sectional view of the pivoting means of the present invention.

DETAILED DESCRIPTION OF THE PREFERRED EMBODIMENT

Figure 2:
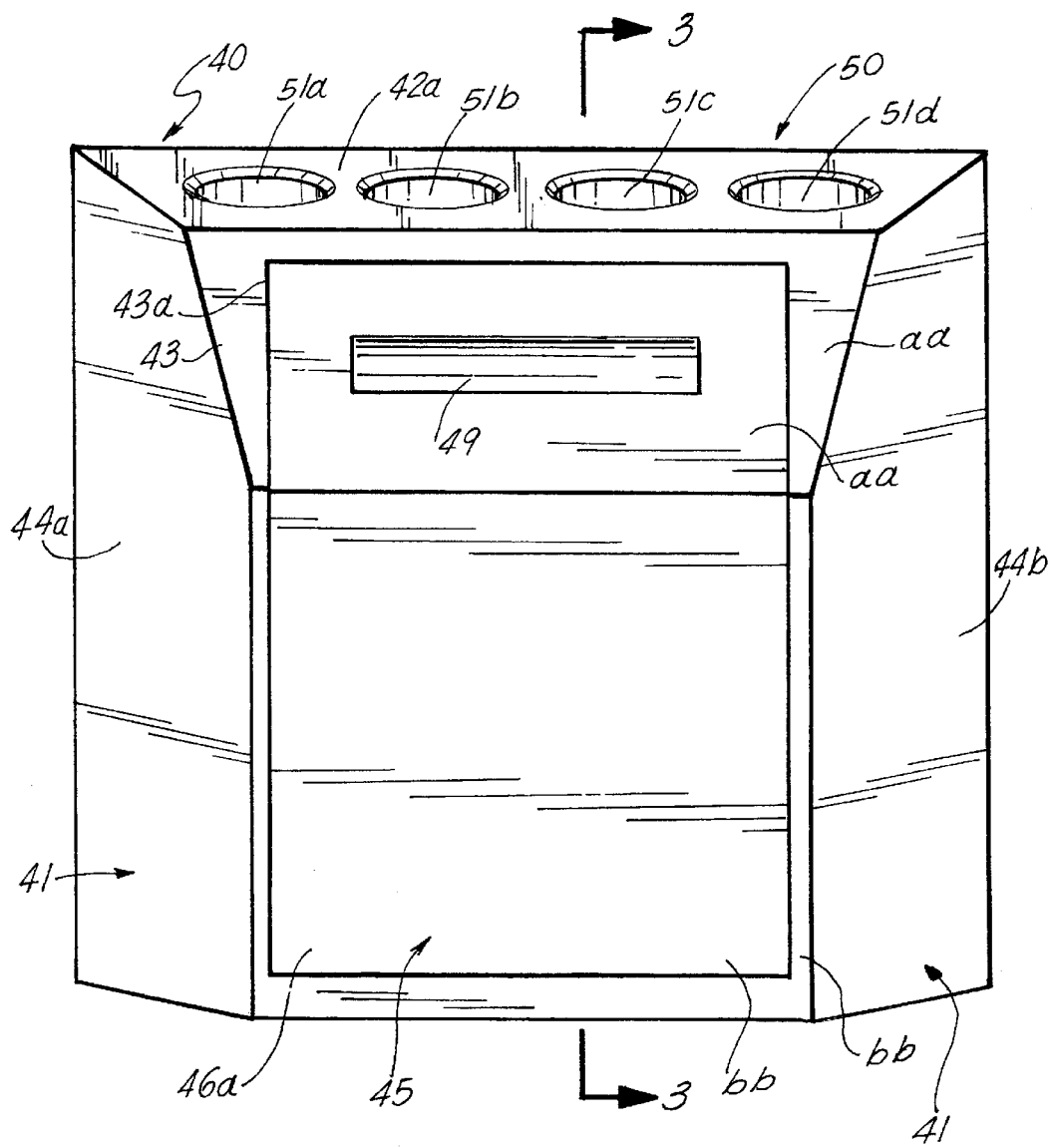
FIG. 2 illustrates a front view of the center waste receptacle or bin assembly of the present invention.

Referring now to the drawings and in particular FIGS. 1–3, the golf cart dashboard of the present invention is generally referenced by the numeral 10. The golf cart dashboard 10 is generally comprised of a dashboard faceplate or panel 20 having a driver's side and passenger's side dashboard compartments or glove boxes 30a and 30b and a center waste receptacle or bin assembly 40 having integrated therewith a beverage holder rack 50 (although the center position of assembly 40 and rack 50 are optional, as assembly 40 can be positioned in other locations in dashboard 10 and rack 50 can be omitted). The center waste receptacle or bin assembly 40 is positioned between the driver's side and passenger's side dashboard compartments or glove boxes 30a and 30b.

The golf cart dashboard 10 further comprises a pair of means for supporting golf balls 60a and 60b and a pair of means for supporting golf tees 65a and 65b integrated into the dashboard faceplate or panel 20. In the exemplary embodiment, a respective one of golf balls supporting means of the pair 60a and 60b and a respective one of the golf tees supporting means of the pair 65a and 65b are below a respective one of the driver's side and passenger's side dashboard compartments or glove boxes 30a and 30b, giving each player a separate glove box 30 and ball support means 60, so that golfing equipment is not inadvertently mixed.

In the exemplary embodiment, the pair of means for supporting golf balls 60a and 60b are each comprised of a resilient elongated channel adapted to receive and support golf balls 3. The pair of means for supporting golf tees 65a and 65b includes a plurality of resilient holes which are capable of friction fit coupling therein golf tees 4.

The dashboard faceplate or panel 20 is made of conventional molded plastic and is adapted to cover the interior cavity in the driver's area and passenger's area of the front-end 5 of the golf cart. The dashboard faceplate or panel 20 has a top panel section 22, depending bottom panel sections 24a and 24b and lower frame sections 26a and 26b which extend downward from the bottom panel sections 24a and 24b along the interior sides of the passenger's area of the front-end 5.

The top panel section 22 has formed therein a driver's side and passenger's side glove box openings 32a and 32b which are covered by driver's side and passenger's side glove box doors 35a and 35b hingedly coupled to the bottom side 36a and 36b, respectively, of the driver's side and passenger's side glove box apertures 32a and 32b, respectively. Below the driver's side and passenger's side glove box openings 32a and 32b, the bottom panel sections 24a and 24b, respectively, depend therefrom.

The driver's side and passenger's side dashboard compartments or glove boxes 30a and 30b each comprise a rear alcove (only one 33 shown in phantom) integrated with the dashboard faceplate or panel 20 behind the openings 32a and 32b.

In an alternate embodiment, the driver's side and passenger's side glove box doors 35a and 35b may be omitted leaving open dash compartments. In a still further embodiment, the driver's side and passenger's side dashboard compartments or glove boxes 30a and 30b may be omitted.

In the exemplary embodiment, the bottom panel sections 24a and 24b are discontinuous and do not extend from the driver's side and to passenger's side. Instead, there are gaps (only one shown 27) between the two side walls 44a and 44b, respectively, of the receptacle housing 41 (described below) and the interior side edge of the bottom panel sections 24a and 24b. The gap 27 on the driver's side is dimensioned to receive therein the steering wheel shaft 2.

The center waste receptacle or bin assembly 40 includes receptacle housing 41 removably coupled to the dashboard faceplate or panel 20 and rotatable waste receptacle 45 pivotally coupled in the receptacle housing 41 via a means for pivoting 47. The rotatable waste receptacle 45 is adapted to be rotated to and from a closed position and an open position via handle 49 coupled to a front panel of the rotatable waste receptacle 45.

The rotatable waste receptacle 45 is generally enclosed and includes a top orifice 45a which is capable of being rotated to and from a closed and an open position about the receptacle housing 41. In the closed position the waste receptacle orifice 45a is covered to maintain the trash or refuse in the rotatable waste receptacle 45.

The rotatable waste receptacle 45 further includes front wall 46a, back wall 46b, bottom surface 46c and two side walls (only one shown 46d) which defines an enclosure to storing trash or refuse. The walls and bottom surface 46b are generally solid to eliminate spills and leaks. The removable nature of assembly 40, allows for easy cleaning.

The receptacle housing 41 includes a top surface 42a which forms an acute angle with the back wall 42d and front panel 43, a bottom surface 42b and two side walls 44a and 44b. The top surface 42a has formed therein the beverage holder rack 50 defined by a plurality of circular recesses 51a, 51b, 51c and 51d dimensioned to support or hold therein beverage containers (cup 97 shown IN PHANTOM in recess 51c in cross-section FIG. 3). The front panel 43 has formed therein an aperture 43a wherein when the rotatable waste receptacle 45 is closed, the front wall 46a of the rotatable waste receptacle 45 is essentially flush with the front panel 43.

In the exemplary embodiment, the front panel 43 and the front wall 46a include a top angulated section aa and a bottom generally vertically straight section bb. Furthermore, the top edge of the back wall 46b of the rotatable waste receptacle 45 includes a rubber stop or grommet 70 (although stop 70 can be made of aluminum).

Referring now to FIG. 4, the pivoting means 47 includes an elongated socket 48 having a concaved contour formed in the front end of the bottom surface 42b of the receptacle housing 41. The pivoting means 47 further includes an elongated projection 49 depending downward from the junction of the front wall 46a and the bottom surface 46c perpendicularly coupled to and the front wall 46a of the rotatable waste receptacle 45. The elongated projection 49 is capable of pivoting in the elongated socket 48.

As best seen in FIG. 2, the rotatable waste receptacle 45 is opened to an angulated position by pulling on handle 49 wherein protrusion 49 rotates in socket 48.

In an alternate embodiment, other pivoting or hinge means may be substituted.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in.a limiting sense.

What is claimed as invention is:

1. A golf cart dashboard for use with a golf cart comprising:
   a dashboard faceplate;
   a driver's side and a passenger's side dashboard compartment or glove box coupled in said dashboard faceplate;
   a waste receptacle assembly coupled in said dashboard faceplate, wherein said waste receptacle assembly is positioned intermediate said driver's side and passenger's side dashboard compartments or glove boxes;
   means for supporting driver golf balls integrated into said dashboard faceplate below said driver's side dashboard compartment or glove box; and,
   means for supporting passenger golf balls integrated into said dashboard faceplate below said passenger's side dashboard compartment or glove box;
   means for supporting driver golf tees integrated into said dashboard faceplate below said driver's side dashboard compartment or glove box; and,
   means for supporting passenger golf tees integrated into said dashboard faceplate below said passenger's side dashboard compartment or glove box.

2. The dashboard of claim 1, wherein said driver's side and passenger's side dashboard compartments or glove boxes each comprise:
   a rear alcove integrated with said dashboard faceplate having an opening formed in said dashboard faceplate; and,
   a hinged door covering said opening.

3. The dashboard of claim 1, wherein said waste receptacle assembly comprises:
   a receptacle housing coupled to said dashboard faceplate in the central region thereof and having a top surface, a front panel, a back surface, two side surfaces and a bottom surface;
   a rotatable waste receptacle pivotally coupled in said front panel of said receptacle housing and having a front wall;
   pivot coupled to said receptacle housing and said rotatable waste receptacle; and,
   a handle coupled to said front wall of said rotatable waste receptacle to rotate said rotatable waste receptacle about said pivot.

4. The dashboard of claim 3, wherein said waste receptacle assembly has integrated therewith a beverage holder rack, said beverage holder rack comprising a plurality of circular recesses formed in said top surface and dimensioned to hold or support therein a beverage container.

5. The dashboard of claim 4, wherein:
   said top surface forms an acute angle with said front panel; and
   said pivot comprises:
      an elongated socket having a concaved contour formed in a front end of said back surface of said receptacle housing, and
      a projection depending downward from a junction of said front wall and a bottom surface of said rotatable waste receptacle adapted to rotate or pivot in said dashboard compartment or glove box.

6. The dashboard of claim 1, wherein:
   said waste receptacle assembly includes:
      a receptacle housing, and
      a generally enclosed waste receptacle having a receptacle orifice and which is capable of being rotated to and from a closed and an open position about said receptacle housing wherein in the closed position said receptacle orifice is covered by a top surface of said receptacle housing to maintain the trash or refuse in the waste receptacle; and,
   a beverage holder rack comprising:
      a plurality of recesses formed in said top surface wherein each recess dimensioned to receive and support therein a beverage container.

7. A golf cart having a front-end in combination with a golf cart dashboard, said golf cart dashboard comprising:
   means for covering an interior cavity of a passenger compartment in said front-end and having a center section between a passenger's side section and a driver's side section;
   means for storing waste coupled to said center section of said covering means;
   means for holding beverage containers essentially upright and which is integrated with said waste storing means;
   a driver's side and passenger's side dashboard compartments or glove boxes;
   means for supporting driver golf balls integrated into said covering means below said driver's side dashboard compartment or glove box; and,
   means for supporting passenger golf balls integrated into said covering means below said passenger's side dashboard compartment or glove box;
   means for supporting driver golf tees integrated into said covering means below said driver's side dashboard compartment or glove box; and,
   means for supporting passenger golf tees integrated into said covering means below said passenger's side dashboard compartment or glove box.

8. The golf cart of claim 7, wherein said golf cart dashboard further comprises:
   means for supporting golf balls integrated into said covering means; and,
   means for supporting golf tees integrated into said covering means.

9. The golf cart of claim 8, having a driver's side and passenger's side dashboard compartments or glove boxes, each of said compartments comprising:
   a rear alcove integrated with said covering means having an opening formed in said covering means; and,
   a means for closing said opening.

10. The golf cart of claim wherein said waste storing means comprises:
    a receptacle housing coupled to said covering means and having a top surface, a front panel, a back surface, two side surfaces and a bottom surface;

a rotatable waste receptacle pivotally coupled in said front panel of said receptacle housing and having a front wall;

pivot coupled to said receptacle housing and said rotatable waste receptacle; and, a handle coupled to said front wall of said rotatable waste receptacle to rotate said rotatable waste receptacle about said pivot.

11. The golf cart of claim 10, wherein said beverage container holding means comprises a plurality of circular recesses formed in said top surface.

12. The golf cart of claim 10, wherein:

said top surface forms an acute angle with said front panel; and said pivot comprises:

an elongated socket having a concaved contour formed in a front end of said back surface of said receptacle housing, and a projection depending downward from a junction of said front wall and a bottom surface of said rotatable waste receptacle adapted to rotate or pivot in said elongated socket.

13. The golf cart of claim 7, wherein:

said waste storing means includes:

a receptacle housing, and a generally enclosed waste receptacle having a receptacle orifice and which is capable of being rotated to and from a closed and an open position about said receptacle housing wherein in the closed position said receptacle orifice is covered by a top surface of said receptacle housing to maintain the trash or refuse in the waste receptacle; and, said beverage container holding means comprises:

a plurality of recesses formed in said top surface wherein each recess dimensioned to receive and support therein a beverage container.

14. A waste receptacle assembly comprising:

a receptacle housing having a top surface, a front panel, a back surface, two side surfaces and a bottom surface, said top surface forming an acute angle with said front panel;

a rotatable waste receptacle pivotally coupled in said front panel of said receptacle housing and having a front wall;

pivot coupled to said receptacle housing and said rotatable waste receptacle, said pivot comprising:

an elongated socket having a concaved contour formed in a front end of said back surface of said receptacle housing, and a projection depending downward from a junction of said front wall and a bottom surface of said rotatable waste receptacle adapted to rotate or pivot in said elongated socket; and, a handle coupled to said front wall of said rotatable waste receptacle to rotate said rotatable waste receptacle about said pivot.

15. The waste receptacle assembly of claim 14, having integrated therewith a beverage holder rack having a plurality of circular recesses formed in said top surface, each recess dimensioned to hold or support therein a beverage container.

16. The waste receptacle assembly of claim 14, wherein:

said rotatable waste receptacle is generally enclosed and has a receptacle orifice and which is capable of being rotated to and from a closed and an open position about said receptacle housing wherein in the closed position said receptacle orifice is covered by a top surface of said receptacle housing to maintain the trash or refuse in the waste receptacle; and, a beverage holder rack comprising:

a plurality of recesses formed in said top surface wherein each recess dimensioned to receive and support therein a beverage container.

17. A waste receptacle assembly comprising:

a receptacle housing having a top surface, a front panel, a back surface, two side surfaces and a bottom surface, said top surface forming an acute angle with said front panel;

a rotatable waste receptacle pivotally coupled in said front panel of said receptacle housing and having a front wall, said receptacle being enclosed and having a receptacle orifice and which is capable of being rotated to and from a closed and an open position about said receptacle housing wherein in the closed position said receptacle orifice is covered by a top surface of said receptacle housing to maintain the trash or refuse in the waste receptacle;

pivot coupled to said receptacle housing and said rotatable waste receptacle, said pivot comprising:

an elongated socket having a concaved contour formed in a front end of said back surface of said receptacle housing, and a projection depending downward from a junction of said front wall and a bottom surface of said rotatable waste receptacle adapted to rotate or pivot in said elongated socket; and, a handle coupled to said front wall of said rotatable waste receptacle to rotate said rotatable waste receptacle about said pivot.

18. The waste receptacle assembly of claim 17, having integrated therewith a beverage holder rack having a plurality of circular recesses formed in said top surface, each recess dimensioned to hold or support therein a beverage container.

* * * * *